US011327889B2

(12) United States Patent
Gerphagnon et al.

(10) Patent No.: US 11,327,889 B2
(45) Date of Patent: May 10, 2022

(54) MULTI-ACCESS TO A DATA FILE STORED IN A DATA-STORAGE SYSTEM RELATED TO A BUFFER MEMORY

(71) Applicant: BULL SAS, Les Clayes-sous-Bois (FR)

(72) Inventors: Jean-Olivier Gerphagnon, Vif (FR); Frédéric Saunier, Sassenage (FR); Grégoire Pichon, Seyssins (FR)

(73) Assignee: BULL SAS, Les Clayes sous-Bois (FR)

(*) Notice: Subject to any disclaimer, the term of this patent is extended or adjusted under 35 U.S.C. 154(b) by 33 days.

(21) Appl. No.: 16/954,752

(22) PCT Filed: Dec. 27, 2018

(86) PCT No.: PCT/FR2018/053552
§ 371 (c)(1),
(2) Date: Jun. 17, 2020

(87) PCT Pub. No.: WO2019/129998
PCT Pub. Date: Jul. 4, 2019

(65) Prior Publication Data
US 2021/0173780 A1    Jun. 10, 2021

(30) Foreign Application Priority Data
Dec. 27, 2017  (FR) ...................... 1763285

(51) Int. Cl.
*G06F 12/0846* (2016.01)
*G06F 9/52* (2006.01)
*G06F 16/18* (2019.01)

(52) U.S. Cl.
CPC ............ *G06F 12/0846* (2013.01); *G06F 9/52* (2013.01); *G06F 9/526* (2013.01); *G06F 16/1858* (2019.01); *G06F 2212/1021* (2013.01)

(58) Field of Classification Search
CPC ........ G06F 9/52; G06F 9/526; G06F 16/1858; G06F 2209/523
See application file for complete search history.

(56) References Cited

U.S. PATENT DOCUMENTS 5,918,229 A    6/1999  Davis et al.
6,148,377 A   11/2000  Carter et al.
(Continued)

FOREIGN PATENT DOCUMENTS

EP    0 278 312 A2    8/1988
EP    1 473 632 A2   11/2004
WO    98/22892 A1     5/1998

OTHER PUBLICATIONS

Clements, Austin T., et al. "Decentralized Deduplication in SAN Cluster File Systems." USENIX annual technical conference. vol. 9. 2009. (Year: 2009).*
(Continued)

*Primary Examiner* — Charles Rones
*Assistant Examiner* — Hewy H Li
(74) *Attorney, Agent, or Firm* — Arc IP Law, PC; Joseph J. Mayo (57) ABSTRACT

The invention relates to a method for managing a buffer memory space associated with a persistent data storage system of a computing machine. The buffer memory space is suitable for temporarily storing in the RAM of the machine one or more portions of a single data file of the persistent data storage system that was previously accessed by one or more processes executed on the machine. The operating system of the machine tracks each of the portions of the file that are projected in the buffer memory space by a descriptor belonging to a plurality of buffer memory projection descriptors which are all associated with the tracking of one or more portions of the file projected in the buffer memory space.

10 Claims, 3 Drawing Sheets

(56) References Cited

U.S. PATENT DOCUMENTS

| | | | |
|---|---|---|---|
| 7,233,946 B1 | 6/2007 | Mcpolin | |
| 9,213,717 B1* | 12/2015 | Pawar | G06F 16/1774 |
| 2008/0256090 A1 | 10/2008 | Dietterich et al. | |
| 2013/0346693 A1* | 12/2013 | Zhang | G06F 12/0866 |
| | | | 711/121 |
| 2015/0207623 A1* | 7/2015 | Pan | G06F 21/602 |
| | | | 713/165 |
| 2018/0267894 A1* | 9/2018 | Jan | G06F 3/0631 |
| 2019/0332568 A1* | 10/2019 | Nesbit | G06F 3/0643 |

OTHER PUBLICATIONS

International Search Report of the International Searching Authority for PCT/FR2018/053552 dated Mar. 14, 2019.

English translation of International Search Report of the International Searching Authority for PCT/FR2018/053552 dated Mar. 14, 2019.

* cited by examiner

MULTI-ACCESS TO A DATA FILE STORED IN A DATA-STORAGE SYSTEM RELATED TO A BUFFER MEMORY

The present invention relates generally to the field of software engineering and more particularly to improving access by a plurality of processes to data of a single data file stored in a persistent data-storage system, said persistent data-storage system being associated with a buffer memory space. The present invention enables, in particular, multiple concurrent accesses to said data file. The invention can be implemented in high-performance computing (HPC) applications, more particularly in relation to the storage of distributed files in the computers.

PRIOR ART

High-performance computing (HPC) is being developed both for academic research and for industry, in particular in technical fields such as aeronautics, energy, climatology, and life sciences. This computing is generally implemented by clusters. The object of these clusters is to exceed the limits of the existing hardware by sharing resources to allow the parallelized execution of instructions and the aggregation of memory and disk capacity. A cluster is a set of computing means (also referred to as nodes) interconnected by an interconnecting network which can carry out combined operations. Clusters consist of a large number of nodes (typically several thousand), the latter being interconnected, for example hierarchically, by switches, and each node is for example a server, a computer or more generally a machine. These clusters also manage a multitude of files in which several tasks from the same application simultaneously access the same file from a single compute node.

Operating systems frequently use a buffer memory space (also referred to as "page cache") in the RAM of a high-performance computer (HPC) to temporarily store portions of files accessed by the applications. This is referred to as memory projections of the files. Since RAM access is quicker than access to the persistent-storage system memory, this process speeds up the subsequent operations of reading and writing the files by the processes when they relate to the same file portions.

Thus, when an application carries out an operation of writing data in a file ("write" system call), the operating system copies these data from the process execution environment into the buffer memory space representing the portion of the file modified by the application. The copying of the data to the persistent storage system, which produces the actual writing into the file, is only carried out by the operating system after the fact, outside of the context of execution of the application. Reference is made to synchronization of the buffer memory space with the persistent storage system to designate this operation.

The data of the buffer memory space representing file portions are managed by the operating system. They remain present in the buffer memory space as long as the system does not need to free up this memory space for another use. This makes it possible to more quickly fulfill future accesses to these file portions by one or more processes of the machine. Indeed, when an application carries out a read operation ("read" system call) in a file, the data of which are already present in the buffer memory space, the operating system directly copies these data from the buffer memory to the process execution environment without accessing the persistent storage system.

To manage the buffer memory space of the files, the operating system stores in descriptors the file portions that are projected in memory. These are, specifically, descriptors of projection of the file portions in the buffer memory space, not to be confused with file descriptors, which are functionally and materially different, and which are used in some operating systems such as the operating systems used in the HPC field. It is recalled that the operating systems used in HPC systems generally are UNIX systems such as for example Linux.

Figure 1:
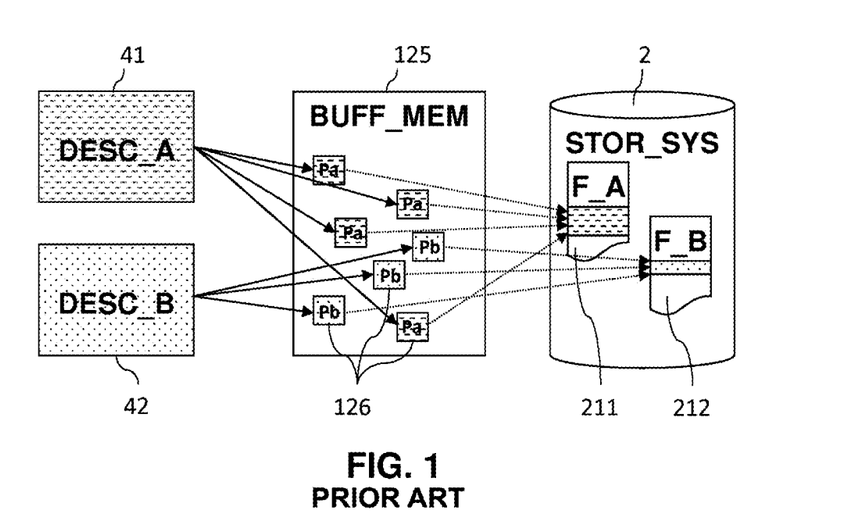
FIG. 1, a diagram illustrating the monitoring of the buffer memory projection of portions of two files according to the prior art, i.e. with two respective descriptors FIG. 2, a block diagram of a machine suitable for implementing embodiments of the method, and FIG. 3, FIG. 4 and FIG. 5, respective embodiments of the method of the invention.

With reference to the diagram of FIG. 1, each buffer memory projection descriptor 41 and 42 makes it possible to monitor the buffer memory space 125 occupied by portions 126 of a respective file of the persistent storage system 2, namely, in the example depicted, file 211 or file 212 for descriptor 41 and for descriptor 42, respectively. Descriptors 41 and 42 also serve to make it possible to store, with the granularity of a memory page, portions that have been modified in memory or else are in the process of synchronization with the persistent storage system 2.

When the data from one of files 211 and 212 are accessed by several processes of the machine, a single descriptor is used by the operating system to identify the portions of the file optionally projected in the memory in the buffer memory space 125.

This results, during multiple concurrent accesses to a file by several processes, in the memory projection descriptor of the file representing a critical resource and a potential point of contention for the inputs/outputs of the operating system.

For example, when ten processes from the same application are all writing their data in separate zones of the same file, the use of a single buffer memory projection descriptor of the file requires the synchronization of the access to the descriptor information and the updating of said information by the operating system across the ten processes. The greater the number of processes accessing the file, the greater the contention on the buffer memory projection descriptor of the file, and the greater the impact on performance.

Thus, there is a need for novel methods or devices that make it possible to ensure that the computing system enables multiple concurrent accesses to the same file by several processes, in particular in the context of a cluster and high-performance computing.

Technical Problem

The object of the invention is therefore to overcome the shortcomings of the background art. In particular, the invention aims to propose a method for managing a buffer memory space associated with a persistent data-storage system of a computing machine capable of managing multiple concurrent accesses to the same file by several processes. Said method must be quick and easy to implement, with a small number of steps. In addition, it must be able to be adapted to the operation of a cluster.

Another aim of the invention is to propose a device able to implement such a method.

BRIEF DESCRIPTION OF THE INVENTION

To this end, the invention relates to a method for managing a buffer memory space associated with a persistent data-storage system of a computing machine. According to the method, the buffer memory space is suitable for temporarily storing, in the RAM of the machine, a set of portions of a single data file of the persistent data-storage system and according to which the portions of the set were previously accessed by one or more processes executed on the machine. In accordance with the present invention, the method comprises the following steps, implemented by an operating system of the machine:

tracking each of the portions of the file that are projected in the buffer memory space by a specific associated descriptor, said associated descriptor belonging to a plurality of buffer memory projection descriptors which are all associated with the tracking of a subset of the set of portions of the file projected in the buffer memory space;

processing a request for access to a portion of the file by a process executed on the machine, using the buffer memory projection descriptor associated with said file portion to identify whether said file portion is projected in the buffer memory space.

Thus, several operations on memory projections of separate portions of the same file can be processed simultaneously using respective buffer memory projection descriptors. These operations comprise, in particular, loading/unloading pages projected in the memory, tagging modified pages, synchronization between the buffer memory space and the storage system. These examples of operations are non-limiting.

By virtue of the invention, the performance of input/output operations on a file will be significantly improved during sustained concurrent accesses by several processes. This situation is a conventional case of usage of high-performance computing applications, wherein several tasks of the same application simultaneously access the same file from a single compute node.

A second aspect of the invention relates to a data-processing device comprising means for implementing the steps of the management method in accordance with the described invention. Such a device may advantageously be an integral part of a high-performance computing system. Thus, according to another aspect, the invention relates to a high-performance computing system comprising a plurality of compute nodes, said system comprising a data-processing device according to invention at least at one of the compute nodes thereof.

In a third aspect, another object of the invention is a computer program product comprising instructions which, when the program is executed by a computer, lead said computer to implement the steps of the method according to the invention.

According to a fourth and final aspect, the invention finally relates to a computer-readable storage medium comprising instructions which, when they are executed by a computer, lead said computer to implement the steps of the method according to the invention.

Other benefits and features of the invention will become apparent upon reading the following description, given by way of illustrative and non-limiting example, with reference to the accompanying drawings, which depict.

DESCRIPTION OF THE INVENTION

For the purposes of the invention, "computing machine" is intended to mean a set of computing structures (i.e. computing devices) or machines able to run one or more processes. The computing machine may be a server or comprise a plurality of devices. The computing machine preferably is a compute node of a high-performance computer. From a structural perspective, the machine may be divided into a plurality of racks. All or most of the racks are computing racks or data-storage racks. Data-storage racks comprise data-storage disks forming a physical storage system, on which a file system (FS), such as a General Parallel File System (GPFS), is mounted, which enables the distributed storage of files on a large number of physical media, which may exceed one thousand.

For the purposes of the invention, the expression "high-performance computer" (HPC) corresponds to a set of computing resources, i.e. hardware resources and software resources, which enable the execution of computing tasks or the storage of digital data. These resources comprise, for example and in a non-limiting manner: rapid computing electronic components (e.g. multi-core processors or graphics cards dedicated to the latest generation of scientific computing), random access memory, and mass storage equipment (or secondary memories), in particular hard drives in large quantities. All of this equipment is associated with an operating system (OS). From a functional perspective, an HPC is a machine which aggregates the above equipment/resources to form a computing cluster.

The operating system is e.g. Windows (registered trademark), or more often UNIX (registered trademark) or one of its variants, such as Linux (registered trademark). Software is executed on this OS which is designed to ensure the global management of the hardware resources by taking advantage of their potential in terms of performance, in particular by utilizing the parallelism and by making transparent the distribution of said resources.

A file system or file management system (FMS) is a way of storing information and organizing it in files stored in the auxiliary memories. Such file management makes it possible to process and store large amounts of data and also to share them among several computer programs, processes or even user applications using said data. It affords each user an abstract view of their data and makes it possible to locate them using an access path. It will be noted that, in absolute terms, there are other ways to organize data, for example databases (in particular relational databases) and indexed files.

It will be noted that "file", in the context of an operating system such as Linux and in the context of the present description, refers to files for which the operating system uses the buffer memory, for example:

data files (for example/home/toto/file.txt), and folders (for example/home/toto).

"Access to the data of a file" is intended to mean data inputs/outputs to/from the file, respectively. These are operations of reading or writing data from or to the file which are carried out by write or read system calls, respectively. This corresponds more broadly to the actions necessary for accessing a file on a local storage medium, either by downloading it or by streaming from remote storage via a web protocol or by accessing a database. This is generally an access path to the file, optionally preceded by an access protocol (such as http://, file://).

Within the meaning of the invention, "coupled" means directly or indirectly connected to one or more intermediate elements. Two elements may be coupled mechanically, electrically or linked by a communication channel.

Within the meaning of this invention, "processor" means at least one physical circuit configured to execute operations according to the instructions contained in a code. The physical circuit can be an integrated circuit. Examples of a processor include, but are not limited to, a central processing unit, a graphics processor, an application-specific integrated circuit (ASIC) and a programmable logic circuit.

For the purposes of the invention, "executable operation" means an action executed by a device or a processor unless otherwise indicated by the context. Examples of executable operations include, without being limited thereto, "processing", "determining", "displaying" and others. In this respect, operations relate to actions and/or processes in a data-processing system, for example a computing system or similar electronic computing device, which manipulates and transforms data represented as physical (electronic) quantities in the memories of the computing system or other devices for storing, transmitting or displaying information.

The terms or expressions "application", "software", "program code" and "executable code" mean any expression, code or notation in a set of instructions intended to cause processing of system data to perform a particular function directly or indirectly (e.g. after a conversion operation to another code). Examples of program code can include, not limited to, a sub-program, a function, an executable application, a source code, an object code, a library and/or any other sequence of instructions designed for execution on a computer system.

In the remainder of the description, the same reference signs are used to designate the same elements.

The description of embodiments of the innovation will be given below with reference to an example of application to a High-Performance Computer (HPC) comprising at least one compute node. The compute node may have a distributed memory service, for example a distributed file system. This situation is a conventional case of usage of High-Performance Computing applications, wherein several tasks from the same application simultaneously access the same file from a single compute node. However, this example is non-limiting, since the innovation can be applied to other data-processing systems.

In this case, the use of a single memory projection descriptor of a file requires synchronizing the access to the information of the descriptor and the updating thereof by the operating system between the different processes accessing the file. This leads to a significant contention on the descriptor and a significant impact on the performance of the system.

The use of multiple memory projection descriptors of the file according to the invention will enable the operating system to process the operations of the different processes using different descriptors, thereby dispensing with the need to synchronize the information at this level.

The method of the innovation is implemented by the operating system which is executed on the compute node. The compute node is conventionally in the form of a server consisting of a processor, memory, optionally local storage, and a network card for communicating with the other nodes of the computer.

A compute node of a high-performance computer comprises different types of memory.

Firstly, there is Random Access Memory (RAM). Read and write accesses to the RAM are quick. For example, the mean bandwidth is 12 GB/s for RAM memories using DDR3 technology. However, this memory does not persist after the system is switched off and the electrical power supply is interrupted.

In addition to this RAM, there secondly is persistent or mass storage memory, which, in HPC computers, generally consists of HDD (Hard Disk Drive) magnetic mass storage drives or any other persistent mass storage technology such as SDD (Solid State Drive, electronic mass storage drives), NVRAM (Non-volatile random-access memory), NVME (Non-volatile memory express storage media). Unlike the former, the latter memory persists after switching off and interrupting the electrical power supply. However, it is very slow comparatively. For example, the maximum bandwidth is 600 MB/s using SAS2.0 technology and generally 100 MB/s using RAID technology.

Each type of memory, RAM and persistent, corresponds to specific uses for data management and the execution of related processes. In particular, the operating system loads into RAM memory all the information stored in the storage system which the processors need in order to run the applications. Once the operations have been carried out by the processors, the resulting information to be retained is copied from the RAM memory to the persistent storage system.

The global resource formed by these two types of memory is also utilized in a crossed-over manner: on the one hand, the persistent memory is used to relieve the RAM when the latter has to manage a large amount of data to perform a computation and in addition, on the other hand, the RAM may also be used to accelerate access to the persistent memory. Indeed, in the first case, if the installed RAM memory is insufficient, then a defined space on the hard drives is used (even though these are slower relatively speaking) as a backup; i.e. in addition to the RAM, according to a technique known by the name of "swap". For example, to this end, the Linux operating system provisions memory space on the hard drives, this space being called "swap memory". In the second case, conversely, and counter to the logic dictating that when an application has finished being executed, the RAM memory it was using is freed up so as to be available for use by other applications, an operating system such as Linux uses part of the RAM memory as a buffer memory space.

Indeed, as was stated above, a hard drive is approximately a hundred times (100×) slower than the RAM. This is why a buffer memory space in the RAM is used in the context of accessing the hard drives of the storage system. Linux places in this buffer memory space all the data awaiting writing to the disk, this writing being carried out during a synchronization operation which groups together the writing of several memory pages. Moreover, the data read on a disk are retained in the buffer memory in order to improve the performance of the system. Information such as, for example, file permissions, the position of free blocks on the disks, etc., are also retained in buffer memory. In short, this may be all the information useful for enhancing the performance of the system in its interactions with devices such as hard drives with a view to subsequently accessing data of portions of files which are stored in the persistent storage system. In other words, the buffer memory serves to accelerate, group together and anticipate accesses to the hard drives of the persistent storage system.

The kernel of the operating system of the HPC manages the resources of the machine and enables the different components, whether hardware or software, to communicate with one another. Various abstractions of the notion of application are provided by the kernel to the developers of user programs. The most common is that of process (or task). The kernel of the operating system is not a task per se, but rather a set of functions that can be called by the different processes in order to carry out operations that require a certain level of privileges. The kernel then generally takes over the process to deliver the requested service and hands back control when the corresponding actions have been performed.

Figure 2:
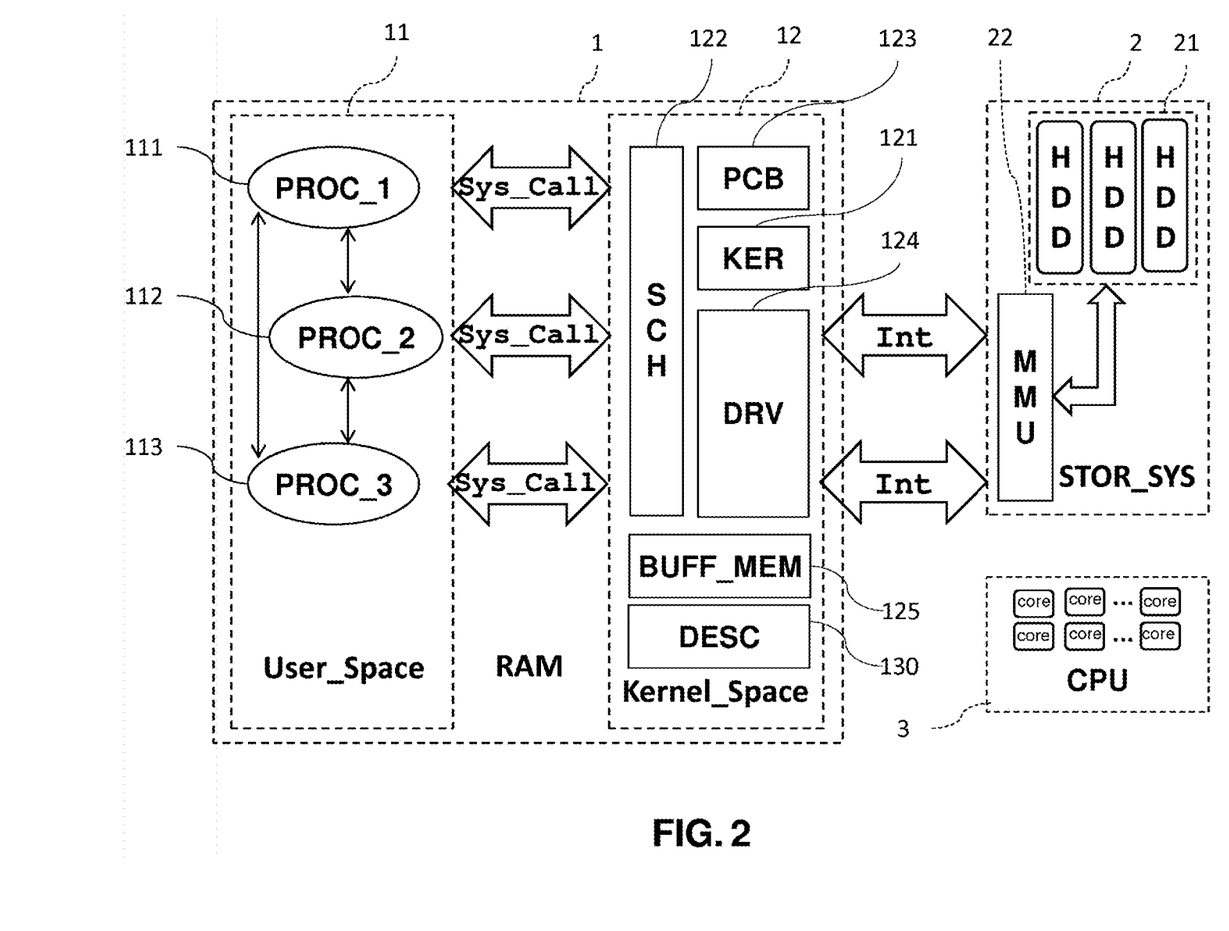

With reference to the block diagram of FIG. 2, the existence of a kernel 121 assumes a virtual division of the RAM 1 into two separate regions. One of these regions corresponds to the user space 11 and is reserved for applications, i.e. user programs which are loaded from the mass storage system 2 into the RAM 1 to be executed by a central processing unit (or CPU) 3. The unit 3 generally comprises a set of processor cores, present in large numbers in an HPC. The other region forms the kernel space 12 and is reserved for the execution of the kernel.

Indeed, the kernel 121 of the operating system is itself software, which is executed in supervisor mode in the kernel space 12 of the RAM 1. The division of the memory space 1 into a user space 11 and a kernel space 12 simplifies the work of application program developers, in particular due to the implementation of the memory paging paradigm, which will be returned to below.

The kernel 121 provides mechanisms for abstraction of hardware, in particular of the memory, of the processor(s), and information exchanges between software and hardware devices. The kernel also authorizes various software abstractions and facilitates communication among the processes. However, it cannot itself use all the abstraction mechanisms it provides to other software.

The kernel provides its functions, namely access to the hardware resources it manages, through system calls SYS_CALL. System calls are functions called from an application program, i.e. a process, during the execution thereof. FIG. 2 depicts three processes, 111, 112 and 113, respectively, which are loaded in the user space 11 of the RAM 1 with a view to their execution. The system calls are processed in the kernel space 12 and a response is provided to the calling program in the user space 11.

A processor core is able to execute a single process; a multiprocessor and/or multicore system is capable of executing as many processes as there are processor cores. Multitask kernels even allow the execution of several processes on one processor, by sharing the processor time between these processes, alternately.

By virtue of the division of the RAM 1 into user space 11 and kernel space 12 of the RAM 1, the applications of the user space 11 cannot accidentally or intentionally access a memory zone not belonging to them. Such an action immediately triggers a backdoor of the kernel, which sends a specific signal to the program, generally to end same.

The kernel 121 works with another software component of the kernel space 12, namely the scheduler 122 of the operating system kernel. The scheduler assigns the execution of the processes 111, 112, 113 to the different processor cores of the central processing unit 3 of the HPC machine. The scheduler 122 executes a scheduling procedure which assigns the processes to be executed to different available processor cores according to specific rules (based for example on priorities respectively associated with the different processes).

If a new process must be executed by a processor core which was hitherto processing another process which has not yet ended, a context change takes place. This is an operation which consists in saving the execution context of the former process, said execution context comprising in particular the state of the processor logs at the time of the change. This save uses a data structure 123 referred to as process control block (PCB). Subsequently, the operating system restores the execution context of the former process which was provisionally suspended, which then resumes its execution where it was previously stopped, either on the same processor once it is available again or on another available processor, where applicable.

From the hardware perspective, the storage system 2 is a mass memory consisting of one or more secondary memories such as magnetic hard drives, SSD (solid-state drive) hard drives, digital optical media, etc., or any combination of these data-storage components. In high-performance computing applications, the storage system generally comprises a large number of hard drives which may be as much as, or even more than, one thousand.

There are hardware abstraction layers (HAL) which make it possible to have the same interface in the user space 11 and thereby simplify the work of application developers. In UNIX-type systems, the abstraction used is the file system. The open, close, read and write primitives are presented to the operating system by the processes being executed in the user space 11 to access the devices, in particular the memories forming the persistent storage system. In addition, the kernel 121 of the operating system transmits or interprets the information bound for, or originating from, respectively, hardware resources, in particular the set 21 of memory media of the storage system 2 (i.e. the hard drives) via INT interrupts. This is what is referred to as the inputs and outputs in the files, or the accesses to the files.

The persistent memory of the data-storage system obeys the paging principle for accesses by applications and by the operating system.

According to this principle, the physical memory is divided into blocks or frames of fixed size. In one example, the blocks have a size equal to 512 bytes. The physical addresses thereof are not known by the processes. From another angle, the memory zone allocated to each process is divided, from a logic perspective, into pages which are generally the same size as the blocks, or have a size corresponding to a multiple of the block size. In one example, the memory pages have a size equal to 4096 bytes. In other words, the pages of the memory of the persistent storage system correspond, in this non-limiting example, to eight data blocks in the storage system. The processes know the logical addresses of the memory pages which they can access. The kernel provides memory space for an application, for example with the granularity of a page, but this is transparent for the application.

The size of the pages, in number of bytes, is a whole power of 2. It is therefore possible to separate the coding of a logical address into two parts: firstly a page/block number encoded by the bits of the heaviest weight of the address, and secondly an offset encoded by the bits of lighter weight of the address which makes it possible to locate the different bytes of the page on the physical medium. The processors each have a dedicated log containing the (physical) address of a mapping table, which is a scalable table that establishes correspondence between logical addresses and physical addresses. The mapping table is modified during a context change: change of process executed by the processor, or switch from user mode to kernel mode.

The buffer memory space also obeys the paging principle as described above, apart from the fact that only the operating system can access the pages of this memory space. In one example, the pages or blocks of the buffer memory of the compute node of the HPC computer have a size equal to 8192 bytes. In other words, the pages of the buffer memory space correspond, in this non-limiting example, to sixteen data blocks in the storage system and to two memory pages in said space.

It will be noted that the implementation of the invention advantageously adapts to the granularity of the buffer memory space that results from the organization of the memory specific to the operating system. This is obtained by defining the descriptors of the projection of the file portions in the buffer memory space based on the size of the memory pages in the buffer memory. In other words, the implementation of the invention does not require the modification of the size of the pages in the buffer memory space, which is still only determined by the specifications of the operating system.

In computing, a file descriptor is an abstract key for accessing a file. In a Unix system, the file descriptors can designate files, directories, special files, named pipes or anonymous pipes. These are generally integers, namely indexes of inputs into a data structure of the kernel of the operating system. This data structure contains the details of all the open files. In the POSIX operating system, for example, this data structure is referred to as a file descriptor table. Each process can have its own file descriptor table. The user application passes the abstract key to the kernel via a system call, and the kernel accesses the file by virtue of this key. The user application cannot directly read or write the file descriptor table.

However, a person skilled in the art will appreciate that the descriptors referred to in the embodiments of the invention are not file descriptors in the above sense. Indeed, each of the descriptors referred to is a descriptor of the projections in the buffer memory space of portions of a file which is stored in the storage memory. They are organized, for example, in the form of a linked list.

The buffer memory projection descriptors are used during two types of operations. Firstly, during an input/output operation in the file which is triggered by a process, in order to know whether the portion of the file concerned by this operation has already been stored in the buffer memory space. Secondly, on the initiative of the operating system during general maintenance operations, in order for example to synchronize the portions of a file in the buffer memory with the data from the corresponding file in the storage system, to free up space in the buffer memory, to clean the pages whose content was modified in the buffer space in order to write them to a disk of the persistent storage system, etc.

In principle, and as shown by the diagram of FIG. 1, already described in the preamble of the present description, there is one descriptor per file of the persistent storage system, one or more portions of which, or a set of portions of which, are projected in the buffer memory space. Thus, even if the data from one file are accessed by several separate processes of the machine, a single descriptor is used by the operating system to identify the portions of the file projected in the memory in the buffer memory space. The disadvantage is that, during multiple concurrent accesses to a file by several separate processes, this single descriptor of the memory projections of the file represents a potential point of contention for the inputs/outputs of the operating system. This adversely affects the data access performance.

It is for this reason that, unlike the prior art described in the introduction with reference to the diagram of FIG. 1, the embodiments of the invention comprise the use of not just one but of several buffer memory projection descriptors. The role of these multiple descriptors is to track (i.e. monitor) the buffer memory space occupied by the different portions of a single data file which are projected in the buffer memory space. The effect of there being several descriptors to monitor these different projections of portions of the same file is that, in the case of concurrent access by different processes being executed in parallel on the machine, the contention on each buffer memory projection descriptor is eliminated, or at least reduced. The allocation to each descriptor, among this plurality of buffer memory projection descriptors, of the monitoring of portions of a single file that are projected in the buffer memory space can be performed according to different embodiments.

Figure 3:
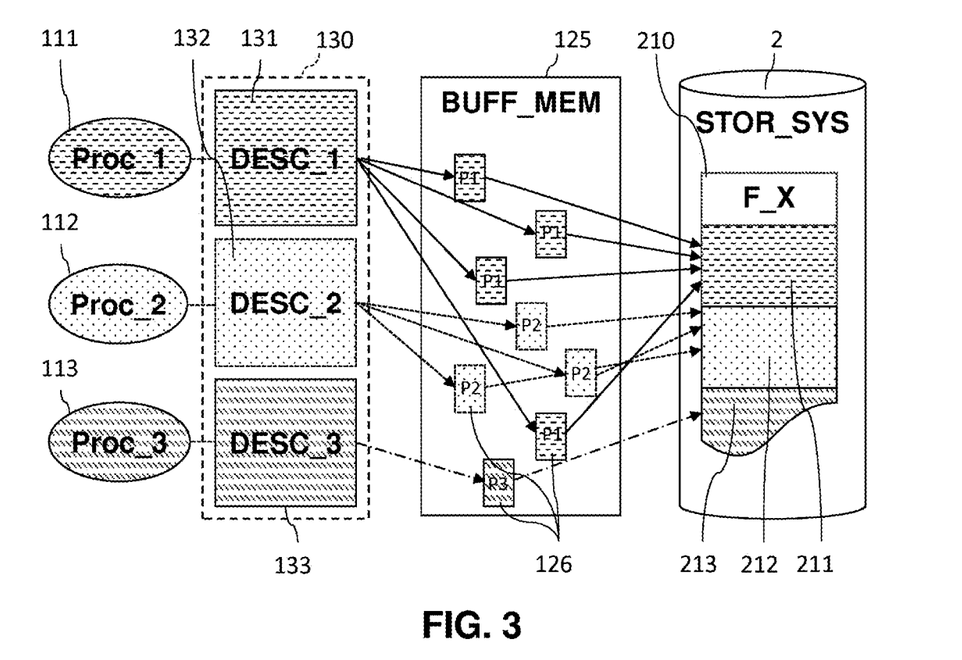

With reference to the diagram of FIG. 3, according to a first embodiment this association is performed depending on the processes 111, 112 and 113 which initially accessed the different portions 126 of the file 210, with the result that these portions of the file 126 were projected in the buffer memory space. There is therefore one descriptor per process.

More particularly, the plurality 130 of buffer memory projection descriptors comprises, at each instant, as many descriptors as there are processes executed on the machine having accessed portions of the file 126 which are projected in the buffer memory space 125. In the example depicted, there are three processes 111, 112 and 113; therefore, there are three buffer memory projection descriptors 131, 132 and 133, respectively.

From a functional perspective, each of the descriptors of the plurality 130 of buffer memory projection descriptors tracks the portion(s) of the file projected in the buffer memory space which were accessed for the first time by a respective one of said processes, when these portions 126 were projected in the buffer memory 125.

In practice, the association of one of the descriptors 131, 132 and 133 among the plurality 130 of buffer memory projection descriptors with a portion of the file when said portion of the file is projected in the buffer memory space is dependent on the process executed on the machine which required access to said portion of the file. The number of descriptors can thus change if the number of processes accessing portions of the same file 210 of the persistent storage system 2 changes over time.

In one embodiment, when a portion of the file is projected in the buffer memory space due to said portion of the file 210 being accessed by a process being executed on the machine for which the plurality of memory projection descriptors does not comprise any associated buffer memory projection descriptor, a new buffer memory projection descriptor is created. In addition, this descriptor is associated with the monitoring of the projection in the buffer memory space of all the portions of the file 210 which are accessed by said process, in addition of course to the portions of the file which will still subsequently be accessed by this same process.

In this embodiment, a buffer memory projection descriptor is deleted as soon as, due to the procedures for freeing up buffer memory space, no portion of the file associated with the associated process is any longer present in the buffer memory space.

This first embodiment has the advantage of being based on the processes, which gives the best performance in terms of speed of access by said processes to the portions of the file projected in the buffer memory space 2. Indeed, each request for read or write access to portions of the file, i.e. each read or write system call, respectively, contains an identifier of the calling process. It is therefore easy to determine, on the basis of this identifier, which buffer memory projection descriptor will make it possible, where applicable, to access the portion(s) of the file which are optionally projected in the buffer memory space 125.

However, a person skilled in the art will appreciate that it may be preferable to ensure that the portions of the file projected in the buffer memory space 2 which are monitored by respective descriptors such as the descriptors 131, 132 and 133 depicted, i.e. the portions of the file 210 which are used by the processes 111, 112 and 113, respectively, belong to separate zones in the storage system, 211, 212 and 213, respectively, in the example depicted. Indeed, this makes it possible to ensure that portions of the file cannot be modified, where applicable, by two different processes if these two processes are accessing it at the same time (or rather if a second process accesses a portion of the file which was modified by a first process before the buffer memory projection of this modified portion of the file had been synchronized in the storage system before being once again projected in the buffer memory space by the system call initiated by said second process). Without such a precaution, there is a risk of corrupting the data of the file 210. To avoid this, appropriate policies for managing the memory space in the storage system may be implemented (optionally involving moving and/or duplicating data). It is also possible to manage priorities for access to different zones of the file 210 in the storage system 2 by the different active processes. These policies are within the capabilities of a person skilled in the art and the description thereof appears to depart from the scope of the present description.

Other embodiments, which will now be presented, do not have the disadvantage of the first embodiment described above.

In these embodiments, the allocation to a portion of the file projected in the buffer memory space of a descriptor among the plurality of buffer memory projection descriptors is not dependent on the process that initiated the system call which causes the projection of said portion of the file in the buffer memory. Instead, this allocation is performed on the basis of an index related to the portion in question of the file. Index is intended here to mean a reference making it possible to identify the portion in question of the file within a series of memory units to which this portion of the file belongs.

The association with one of the determined descriptors among the plurality of existing buffer memory projection descriptors can advantageously be carried out on the basis of the byte index of the file in the storage system. The complexity of the association arises from the fact that the plurality of existing buffer memory projection descriptors is a scalable plurality in the sense that a new descriptor can be created in the event of the projection of a new portion of the file in the buffer memory space by a process which was not yet represented by an associated descriptor.

A description will be given hereinafter, with reference to the diagrams of FIGS. 4 and 5, of two examples of segmentation policies which are non-limiting examples. Indeed, other policies can be used, according to the specifics of each application of the method.

Figure 4:
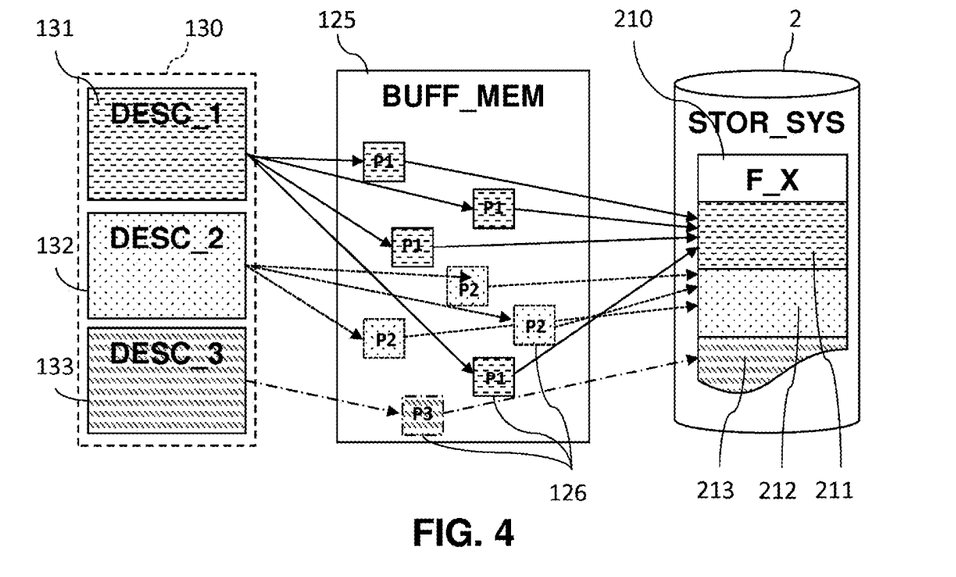

With reference to the diagram of FIG. 4, the segmentation of the file 210 and the distribution of the file portions 126 corresponding to the plurality 130 of buffer memory projection descriptors can first of all be performed by consecutive zones of the file 210. Thus, in the example depicted in which there are three descriptors, the portions 211, 212 and 213 of the file 210 having the indexes from 0 to N−1, for example, are monitored by the descriptor 131, the portions of the file having the indexes from N to 2*N−1 are monitored by the descriptor 132, and the portions of the file having the indexes from 2*N to 3*N−1 are monitored by the descriptor 133. Generally speaking, the portions of the file having the indexes between i*N and (i +1)*N−1 are monitored by the ith buffer memory projection descriptor.

The value of N determines the size of the zone of the buffer memory space associated with each buffer memory projection descriptor. The choice of this value N is an implementational choice, which can advantageously depend on the access profile of the processes.

Advantageously, this embodiment does not have the disadvantage highlighted above regarding the embodiment of FIG. 3. Indeed, no data corruption can result from the simultaneous access to file portions by separate processes via different descriptors, since each descriptor monitors the buffer memory projection of clearly determined zones of the file 210 in the storage system 2.

It will be noted that the number of descriptors is not limited in the embodiment of FIG. 4, since it depends, aside from the value of N, on the size of the file 210 which is not known beforehand. This may not pose any particular problem in most applications, but may also be a disadvantage in certain applications since it is not possible to reserve in advance the size of the memory required in the kernel space in order to store the data structure corresponding to the plurality 130 of buffer memory projection descriptors. This data structure is generally a linked list, which will therefore clearly be of variable length and this length will not be known in advance.

Figure 5:
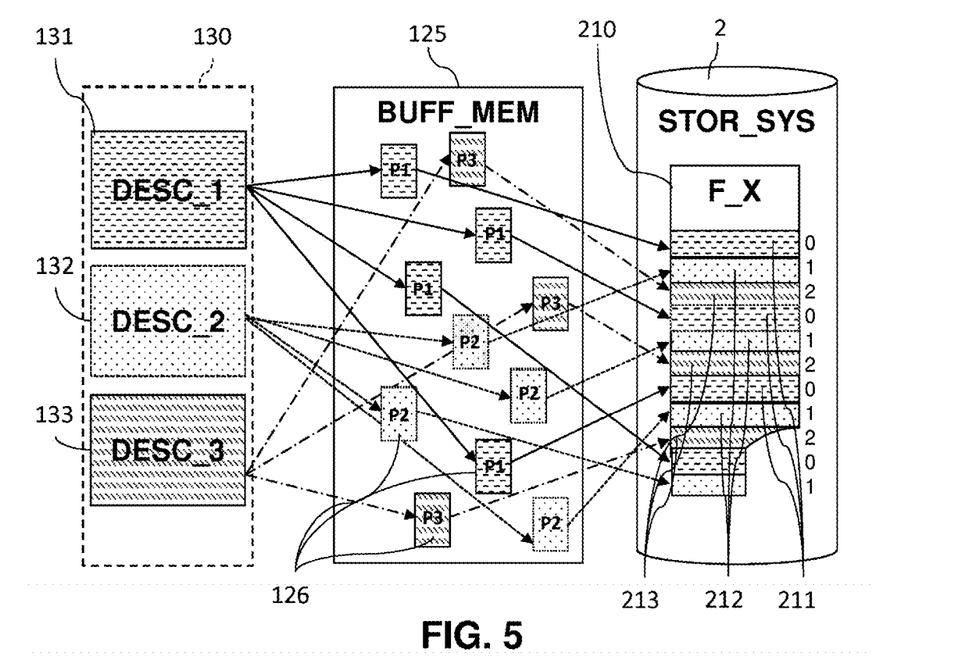

The embodiment of FIG. 5 overcomes this disadvantage while retaining the above-mentioned advantages of the embodiments of the method according to FIG. 4. Indeed, in this embodiment, the segmentation of the file 210 and the distribution of the portions of the file 126 corresponding to the buffer memory projection descriptors is carried out by interleaved zones. In this case, the number of descriptors is fixed, for example equal to M, where M is an integer. In the example depicted, M is equal to three (M=3). The indexes for which the remainder from the division by the number M of descriptors is equal to i are monitored by the ith buffer memory projection descriptor. The advantage is that the total number of buffer memory projection descriptors is fixed, and known natively by the operating system. This embodiment is easier to implement than that of FIG. 4 described above, wherein the number of descriptors is undefined.

On the other hand, the effectiveness of this embodiment is limited in terms of the number of concurrent accesses that can be supported. Indeed, since the number of descriptors of projections of the file in the buffer memory space is limited to M, the number of processes that can simultaneously and concurrently access the buffer memory space without suffering from potential contentions is also limited to M. In practice, the choice of the number M is again an implementational choice left to the judgment of a person skilled in the art depending on the specifics of the application.

A person skilled in the art will appreciate that, regardless of the embodiment chosen, the value of the innovation lies mainly in the reduced contention during the monitoring of portions of a file that are projected in buffer memory, and in the possible parallelization of the processing of operations on the buffer memory projections of the file.

This invention has been described and illustrated in this detailed description and in the figures of the annexed drawings in possible embodiments. This invention is, however, not limited to the forms of embodiment presented. Other variants and embodiments can be deduced and implemented by the person skilled in the art when reading this description and seeing the attached drawings.

In the claims, the term "comprise" does not exclude other elements or other steps. A single processor, or several other units, can be used to embody the invention. The different features presented and/or claimed can advantageously be combined. The presence thereof in the description or in different dependent claims does not rule out this possibility. The reference symbols cannot be interpreted as limiting the scope of the invention.

What is claimed is:

1. A method for managing a buffer memory space associated with a persistent data-storage system of a computing machine, said buffer memory space being suitable for temporarily storing in a RAM of the computing machine, a set of portions of a single data file of the persistent data-storage system, said set of portions having respectively been previously accessed by one or more processes executed on the computing machine, wherein the method is implemented by an operating system of the computing machine, and wherein the method comprises:

tracking each of the set of portions of the single data file that are projected in the buffer memory space by a specific associated descriptor said specific associated descriptor belonging to a plurality of buffer memory projection descriptors associated with the tracking of a subset of the set of portions of the single data file that is projected in the buffer memory space;

processing a request for access to a portion of the single data file by a process executed on the computing machine, using a buffer memory projection descriptor of the plurality of buffer memory projection descriptors that is associated with said portion of the single data file to identify whether said portion of the single data file is projected in the buffer memory space;

wherein the plurality of buffer memory projection descriptors comprises at each instant as many descriptors as there are processes executed on the computing machine that has accessed said set of portions of the single data file which are projected in the buffer memory space;

each descriptor of said plurality of buffer memory projection descriptors tracks the set of portions of the single data file projected in the buffer memory space which were accessed by a respective one of said processes; and specific associated descriptor among the plurality of buffer memory projection descriptors associated with the portion of the single data file when said portion of the single data file is projected in the buffer memory space is dependent on said processing said request executed on the computing machine which requires access to said portion of the single data file.

2. The method according to claim 1, further comprising projecting said portion of the single data file in the buffer memory space, wherein when a said portion of the single data file is projected in the buffer memory space due to said portion of the single data file being accessed by said process executed on the computing machine for which the plurality of buffer memory projection descriptors does not comprise any associated buffer memory projection descriptor, a new buffer memory projection descriptor is created and associated with the monitoring of a projection in the buffer memory space of said set of portions of the single data file accessed by said process.

3. The method according to claim 1, wherein the specific associated descriptor among the plurality of buffer memory projection descriptors associated with a said portion of the single data file when said portion of the single data file is projected in the buffer memory space, is dependent a byte index of the portion of the single data file.

4. The method according to claim 3, further comprising segmentation of the single data file and distribution of the set of portions of the single data file corresponding to the plurality of buffer memory projection descriptors which is carried out by consecutive zones of the single data file of fixed size in one of representation spaces of the single data file of the persistent data-storage system.

5. The method according to claim 3, further comprising segmentation of the single data file and distribution of the set of portions of the single data file corresponding to the plurality of buffer memory projection descriptors which is carried out by associating M interleaved zones of the single data file espectively with M buffer memory projection descriptors, where M is a determined integer.

6. The method according to claim 1, wherein the computing machine is a compute node of a high-performance computer.

7. A high-performance computing system comprising:
a plurality of compute nodes, and
a data-processing device at least at one of the plurality of compute nodes, wherein the data-processing device comprises means for implementing a method for managing a buffer memory space associated with a persistent data-storage system of a computing machine, said buffer memory space being suitable for temporarily storing in a RAM of the computing machine, a set of portions of a single data file of the persistent data-storage system, said set of portions having respectively been previously accessed by one or more processes executed on the computing machine, wherein the method is implemented by an operating system of the computing machine, and wherein the method comprises:

tracking each of the set of portions of the single data file that are projected in the buffer memory space by a specific associated descriptor, said specific associated descriptor belonging to a plurality of buffer memory projection descriptors associated with tracking of a subset of the set of portions of the single data file that is projected in the buffer memory space;

processing a request for access to a portion of the single data file by a process executed on the computing machine, using a buffer memory projection descriptor of the plurality of buffer memory projection descriptors that is associated with said portion of the single data file to identify whether said portion of the single data file is projected in the buffer memory space;

wherein the plurality of buffer memory projection descriptors comprises at each instant as many descriptors as there are processes executed on the computing machine that has accessed said set of portions of the single data file which are projected in the buffer memory space;

each descriptor of said plurality of buffer memory projection descriptors tracks the set of portions of the single data file projected in the buffer memory space which were accessed by a respective one of said processes; and specific associated descriptor among the plurality of buffer memory projection descriptors associated with the portion of the single data file when said portion of the single data file is projected in the buffer memory space is dependent on said processing said request executed on the computing machine which requires access to said portion of the single data file.

8. A non-transitory computer program product comprising instructions which, when is executed by a computer, lead said computer to implement a method for managing a buffer memory space associated with a persistent data-storage system of a computing machine, said buffer memory space being suitable for temporarily storing in a RAM of the computing machine, a set of portions of a single data file of the persistent data-storage system, said set of portions having respectively been previously accessed by one or more processes executed on the computing machine, wherein the method is implemented by an operating system of the computing machine, and wherein the method comprises:

tracking each of the set of portions of the single data file that are projected in the buffer memory space by a specific associated descriptor, said specific associated descriptor belonging to a plurality of buffer memory projection descriptors associated with tracking of a subset of the set of portions of the single data file that is projected in the buffer memory space;

processing a request for access to a portion of the single data file by a process executed on the computing machine, using a buffer memory projection descriptor of the plurality of buffer memory projection descriptors that is associated with said portion of the single data file to identify whether said portion of the single data file is projected in the buffer memory space;

wherein the plurality of buffer memory projection descriptors comprises at each instant as many descriptors as there are processes executed on the computing machine that has accessed said set of portions of the single data file which are projected in the buffer memory space;

each descriptor of said plurality of buffer memory projection descriptors tracks the set of portions of the single data file projected in the buffer memory space which were accessed by a respective one of said processes; and specific associated descriptor among the plurality of buffer memory projection descriptors associated with the portion of the single data file when said portion of the single data file is projected in the buffer memory space is dependent on said processing said request executed on the computing machine which requires access to said portion of the single data file.

9. A non-transitory computer-readable storage medium comprising instructions when executed by a computer, lead said computer to implement a method for managing a buffer memory space associated with a persistent data-storage system of a computing machine, said buffer memory space being suitable for temporarily storing in a RAM of the computing machine, a set of portions of a single data file of the persistent data-storage system, said set of portions having respectively been previously accessed by one or more processes executed on the computing machine, wherein the method is implemented by an operating system of the computing machine, and wherein the method comprises:

tracking each of the set of portions of the single data file that are projected in the buffer memory space by a specific associated descriptor, said specific associated descriptor belonging to a plurality of buffer memory projection descriptors associated with tracking of a subset of the set of portions of the single data file that is projected in the buffer memory space;

processing a request for access to a portion of the single data file by a process executed on the computing machine, using a buffer memory projection descriptor of the plurality of buffer memory projection descriptors that is associated with said portion of the single data file to identify whether said portion of the single data file is projected in the buffer memory space;

wherein the plurality of buffer memory projection descriptors comprises at each instant as many descriptors as there are processes executed on the computing machine that has accessed said set of portions of the single data file which are projected in the buffer memory space;

each descriptor of said plurality of buffer memory projection descriptors tracks the set of portions of the single data file projected in the buffer memory space which were accessed by a respective one of said processes; and specific associated descriptor among the plurality of buffer memory projection descriptors associated with the portion of the single data file when said portion of the single data file is projected in the buffer memory space is dependent on said processing said request executed on the computing machine which requires access to said portion of the single data file.

10. A method for managing a buffer memory space associated with a persistent data- storage system of a computing machine, said buffer memory space being suitable for temporarily storing in a RAM of the computing machine, a set of portions of a single data file of the persistent data-storage system, said set of portions having respectively been previously accessed by one or more processes executed on the computing machine, wherein the method is implemented by an operating system of the computing machine, and wherein the method comprises:

tracking each of the set of portions of the single data file that are projected in the buffer memory space by a specific associated descriptor, said specific associated descriptor belonging to a plurality of buffer memory projection descriptors associated with tracking of a subset of the set of portions of the single data file that is projected in the buffer memory space;

processing a request for access to a portion of the single data file by a process executed on the computing machine, using a buffer memory projection descriptor of the plurality of buffer memory projection descriptors that is associated with said portion of the single data file to identify whether said portion of the single data file is projected in the buffer memory space;

wherein the specific associated descriptor among the plurality of buffer memory projection descriptors associated with said portion of the single data file when said portion of the single data file is projected in the buffer memory space, is dependent on a byte index of the portion of the single data file; and, segmentation of the single data file and distribution of the set of portions of the single data file corresponding to the plurality of buffer memory projection descriptors which is carried out by associating M interleaved zones of the single data file respectively with M buffer memory projection descriptors, where M is a determined integer.

* * * * *